United States Patent [19]
Gouldson

[11] Patent Number: 5,944,237
[45] Date of Patent: Aug. 31, 1999

[54] METHOD AND SYSTEM FOR COLOR CODING SIZES OF GARMENTS

[75] Inventor: Stanley F. Gouldson, Northport, N.Y.

[73] Assignee: Spotless Plastics Pty. Ltd., Australia

[21] Appl. No.: 08/646,994

[22] Filed: May 9, 1996

[51] Int. Cl.⁶ .................................................. A47G 25/14
[52] U.S. Cl. .............................................. 223/85; 40/322
[58] Field of Search ................................ 223/85, 92–88, 223/95; 40/322

[56] References Cited

U.S. PATENT DOCUMENTS

| | | |
|---|---|---|
| 4,006,547 | 2/1977 | Samuels et al. . |
| 4,322,902 | 4/1982 | Lenthall . |
| 5,272,806 | 12/1993 | Marshall et al. . |
| 5,285,566 | 2/1994 | Marshall et al. . |
| 5,388,354 | 2/1995 | Marshall et al. . |
| 5,558,280 | 9/1996 | Morgan . |

FOREIGN PATENT DOCUMENTS

| | | |
|---|---|---|
| 42320/78 | 7/1978 | Australia . |
| 26077/84 | 8/1984 | Australia . |
| 1524878 | 9/1978 | United Kingdom . |

OTHER PUBLICATIONS

AE Products Group Catalog (1992). "New Dimensions in Hanger Design". (Selected Pages).

Color Coding to Help the Consumer, *BFIA*, Oct. 1991 at p. 2.

Gayfers. "Retailers reduce waste with hanger recycling," *Chain Store Age Executive With Shopping Center Age*, 1997, 73, 182.

Anonymous. "Recycling is no longer a hang–up," *Material Handling Engineering*, 1997, 52, 61.

*Primary Examiner*—Bibhu Mohanty
*Attorney, Agent, or Firm*—Scully, Scott Murphy & Presser

[57] ABSTRACT

The specification discloses a method and system for color coding the sizes of garments to be displayed and sold in a retail clothing or department store which has a plurality of clothing lines for a plurality of consumer groups, wherein each consumer group includes individual consumers of similar physiology. The system and method provide a uniform color sizing code to assist individual consumers in locating items of clothing in different lines of clothing appropriate to their personal physiology. The individual items of clothing to be offered for sale are first classified into a plurality of clothing lines, and each of the clothing lines is segregated into a plurality of graded sizes. Some of the common size designations such as S(small), M(medium), L(large) or XL(extra-large) appear in all of said lines, although they may represent different sized clothing in the different lines. Large scale consumer demographics are then used to identify graded sizes in different clothing lines that would be selected by a consumer selecting clothing appropriate for their personal physiology, and a common color code is assigned to each graded size designation to form a matched set of graded sizes common to a specific consumer physiology. Thus, when the individual items of clothing in the various lines are displayed on hangers in different areas of the store, they have a color code that is specific to the specific consumer physiology. This color code may be displayed by a color coded size cap mounted on the hanger which displays the article of clothing, wherein the color of said size cap conforms to the assigned common color code, so that a consumer may move from one area within the store that displays one line of clothing to another area within the store displaying other lines of clothing and find articles of clothing appropriate to their personal physiology identified by the same common color code throughout the store.

24 Claims, 9 Drawing Sheets

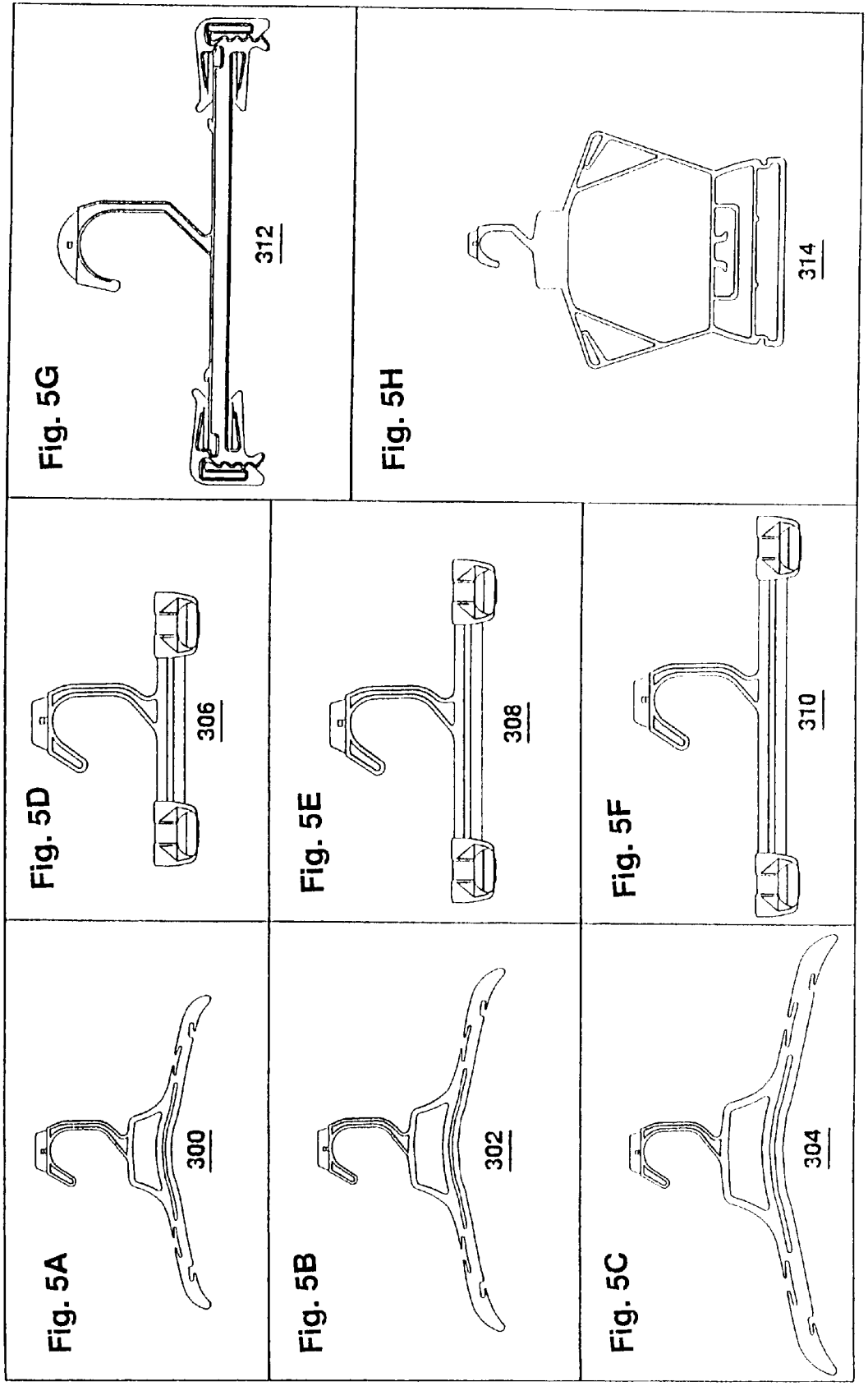

FIG.6A

| ROW | COLUMN DESCRIPTION | 1 LEMON 101 U | 2 PINK 189 U | 3 AQUA 326 U | 4 RED 192 U | 5 TAN 145 U | 6 YELLOW 121 U |
|---|---|---|---|---|---|---|---|
| A | UNIVERSAL | | XXS | | XS | | S |
| B | Tall/Multi | | | | | | |
| C | INFANT/TODDLERS | | NB | | 6M | 9M | 12M |
| D | METRIC | | 3 | 2 | 4 | | 5 |
| E | Multi-sizes | | 3/4 | | | | 5/6 |
| F | Plus-sizes | | 16W | | 18W | | 20W |
| G | WAIST (imperial) | 27 | 28 | 29 | 30 | 31 | 32 |

FIG.6B

| 7<br>LT-BLUE<br>306 U | 8<br>GREEN<br>340 U | 9<br>SKY<br>2975 U | 10<br>PURPLE<br>2715 U | 11<br>OLIVE<br>398 U | 12<br>BLUE<br>285 U | 13<br>ORANGE<br>165 U |
|---|---|---|---|---|---|---|
| | M | | | | L | LT |
| | S/M | | 1 SIZE | | M/L | 36M |
| | 18M | | | | 24M | 10 |
| 6 | 7 | | 8 | | 9 | |
| | 7/8 | | | | 9/10 | |
| | 6X/7 | | | | | |
| | 22W | | | | 24W | |
| 33 | 34 | 35 | 36 | 37 | 38 | 40 |

FIG.6C

| 14 | 15 | 16 | 17 | 18 | 19 | 20 |
|---|---|---|---|---|---|---|
| PURPLE 2593 U | LT GREEN 375 U | BUR/G 246 U | YELLOW 101 U | AQUA 326 U | TAN 145 U | SKY 2975 U |
| | | | Color repeat >>>>> | | | |
| XL | | XXL | | XXXL | | |
| L/XL | XLT | | XXLT | | | |
| 2T | | 3T | | 4T | | 5T |
| 11 | 12 | 13 | 14 | 15 | 16 | 18 |
| 11/12 | | 13/14 | | 15/16 | | |
| 26W | | | | | | |
| 42 | 44 | 46 | 48 | | | |

METHOD AND SYSTEM FOR COLOR CODING SIZES OF GARMENTS

FIELD OF INVENTION

The present invention is directed to the field of clothing display in retail stores and provides a method and system for hanging and color coding clothing on display to assist consumer groups in locating clothing appropriate to their physiology.

BACKGROUND OF INVENTION

An article of clothing typically includes one or more labels located somewhere inside of the clothing article. The label usually includes size, fiber content and manufacturer details as well as information relating to country of origin and care instructions. In addition, a tag is attached to the article of clothing identifying the price of the garment as well as size. The tag often includes additional information relating to the store name, manufacturer and possibly a bar code which when scanned provides such information.

In some cases a particular retailer or garment manufacturer has attached a further tag to the garment which bears a design that is in part colored to permit sorting according to some attribute of the garment such as style, color or size. For instance, the portion of the design that is colored may be blue to indicate a women's size 6 or green to indicate a women's size 8 or blue to indicate a men's size 44 or green to indicate a men's size 48. When such information is included on the tag attached to a garment, the consumer or retailer need not review the label of each item of clothing but merely locate the appropriately colored tag.

However, tags are often attached to either the front, back or sleeve of the garment and thus, are not readily visible to either the retailer or the consumer. The retailer or consumer must rifle through the garments on the rack to locate the tags with the pertinent information. If the garment is not hung on a rack but folded in stacks (as is typical with sweaters and jeans) the tags are often tucked inside the garment for purposes of a neater display, thus, it is necessary to unfold the garment to find the appropriate information.

Furthermore, there is virtually no uniformity between manufacturers and/or retailers as to the designation of the desired attribute of the clothing. For instance, the color blue may mean size 6 for one manufacturer or retailer but size 12 for another. Thus, the consumer is not aided by the color designation when visiting different areas of the store. Further, blue may refer to large in a men's jacket size but medium for men's slacks.

For purposes of displaying garments suspended on hangers in an orderly and attractive manner to the retail customer, it is often desired to affix an indicating means on the hanger in a position visible to the retail customer while the hanger is suspended on a rack. The indicating means identifies some attribute of the garment suspended from the hanger, such as size, quality, color, manufacturing data, or pattern.

The provision of a readily visible size indicator on a garment hanger is now accepted by retailers as a desirable addition to a garment hanger. To accommodate the various types of hangers available in the industry numerous indicating means have been developed in a variety of shapes, sizes and materials. Similarly, hangers have been developed to accommodate a variety of different indicating means.

In Australian Patent No. 638436 and corresponding U.S. Pat. No. 5,388,354, assigned to the assignee of the present invention, a low-profile molded plastic indicator for a garment hanger which requires limited modification to the hook of the hanger to enable the indicator to be securely attached to the top of the hook where it is most visible is described. The indicator is also designed to enable sorting into a predetermined orientation to enable automated handling and fitting of the indicators to hangers as described in U.S. Pat. Nos. 5,272,806 and 5,285,566 which are assigned to the assignee of the present invention.

SUMMARY OF INVENTION

Accordingly, it is an object of the present invention to provide a uniform system and method for color coding an attribute of clothing which is then used by the consumer and/or retailer to distinguish the item from other items.

The invention therefore provides a method and system for color coding the sizes of clothing displayed in retail clothing stores having a plurality of clothing lines for a plurality of consumer groups such that consumers may move from an area displaying one line of clothing to another area within the retail store displaying other lines of clothing and easily find articles of clothing appropriate to their physiology identified by the same color code.

More particularly, the present invention is directed to a method of color coding which includes:

(a) classifying the individual items of clothing to be offered for sale into a plurality of clothing lines;

(b) segregating each of the clothing lines into a plurality of graded sizes with a plurality of common size designations that appear in all of the clothing lines;

(c) identifying graded sizes in different clothing lines that would be selected by a consumer selecting clothing appropriate for the same consumer's physiology;

(d) assigning a common color code to each graded size designation identified in step (c) above to form a matched set of graded sizes common to a specific consumer physiology; and (e) displaying the individual items of clothing on hangers having a color coded size cap mounted thereon, the color of said size cap conforming to the assigned common color code.

Thus, the consumer may move from an area displaying one line of clothing to another within the retail store displaying other lines of clothing and find articles of clothing appropriate to his or her physiology which are identified by the same common color code.

The method of the present invention specifically contemplates color coding the sizes of individual lines of clothing such as women's apparel, men's apparel, women's apparel sized by waist, men's apparel sized by waist, plus sized apparel, infant and toddler apparel, youth apparel, and intimate apparel.

The clothing is graded into size designations which are common to the individual lines of clothing. The graded sizes are based on large scale consumer physiological demographics, so that in identifying the graded size for an item of clothing sized by a waist size, the size identified is common to the graded size of an item of clothing sized by a chest size for the same consumer physiological profile.

Common size designations include S(small), M(medium), L(large) and XL(extra large). Less common but still often utilized are the following size designations XS(extra-small), P/S (petite/small), S/M (small/medium), M/L(medium/large), XXL(extra-extra large) and XXXL (extra-extra-extra large).

In some situations a more specific size designation is required arid the common size designations can be translated into numeric size designations such as 2, 4, 6, 8, 10, 12, 14, 16, 18 and 20, or 1, 3, 5, 7, 9, 11, 13 and so on. In an infant line of clothing the size designations may be 3 months, 6 months, 9 months, 12 months, 18 months and 24 months.

A common color code is assigned to each graded size designation so as to form a matched set of graded sizes common to a specific consumer physiology profile. The common color codes are selected from 16 easily distinguishable colors. In a preferred embodiment the colors are selected from: lemon, pink, aqua, red, tan, yellow, light blue, green, sky blue, purple, olive, royal blue, orange, light green, burgundy, brown, peach, gold, lilac, gun metal, beige and smoke. The only colors repeated for graded size designations are repeated in clothing lines not worn by the same consumer, as for example in an infant/toddler clothing line and a pius-sized clothing line.

For instance, the size XXS, newborn and 3 months may be used in different lines of clothing as size designations. However, all of these clothes are about the same size and thus would fit infants of similar physiology. By displaying all of these individual items of clothing on hangers having a pink size cap mounted thereon, the color pink indicates that the clothing will fit a particular infant physiology.

The same color designating for instance the smaller sized infant apparel can also be used in other lines of clothing such as women's apparel to designate the smaller sized clothing within that line, such as XXS, size 3 and size 28 waist. Thus, the purchaser may move from area to area of the retail store and find articles of clothing appropriate to fit a particular physiology based on the color coding of the sizes.

In other words, a female consumer conforming to an average physiological demographic profile can move from area to area within the retail store, reviewing numerous lines of clothing, as for example, from slacks, to suits, to dresses, to coats and to intimate apparel by many different manufacturers or designers and find the size appropriate to her physiological profile identified by the same color code in each area for each separate line of clothing. The same consumer when making purchases for others can still use the same common color code to locate articles of clothing for others.

The system of the present invention provides for color coding the sizes of clothing displayed in retail clothing stores having a plurality of clothing lines for a plurality of consumer groups, wherein each consumer group includes individual consumers of similar physiology, said system providing a uniform color sizing code to assist individual consumers in locating items of clothing in different lines of clothing appropriate to their physiology in different areas of the retail store, said system comprising:

(a) a plurality of individual items of clothing to be offered for sale, each item classified into one of a plurality of clothing lines;

(b) a plurality of graded sizes for each of said clothing lines, said graded sizes having a plurality of common size designations that appear in all of said lines;

(c) a common code group having the same code identification for identifying graded sizes in different clothing lines that would be selected by a consumer selecting clothing appropriate for the same consumer physiology;

(d) a plurality of color coded index caps, each of said colored codes assigned to a common code group identified in step (c) above to form a matched set of color coded index caps identifying graded sizes common to a specific consumer physiology;

(e) a plurality of hanger styles for displaying the individual items of clothing, each of the hangers having one of said color coded index caps mounted thereon, the color of said index cap conforming to the assigned common code group, whereby a consumer may move from an area displaying one line of clothing to another within said detail store displaying other lines of clothing and find articles of clothing appropriate to their physiology displayed on hangers identified by the same index cap color.

The graded sizes are based on large scale consumer physiological demographics, so that in identifying the graded size for an item of clothing sized by a waist size, the size identified is common to the graded size of an item of clothing sized by a chest size for the same consumer physiological profile. Furthermore, in a preferred form of the invention, a consumer conforming to an average physiological demographic profile can move from department to department within the retail store, reviewing plural lines of clothing, as for example, from slacks, to suits, to dresses, to coats and to intimate apparel and find the size appropriate to his or her physiological profile identified by the same color coded index cap in each department for each separate line of clothing.

The colors used by the color codes index caps are selected from about 16 easily distinguishable colors such as those described above. Typically, each color designates a different size. In the present system each color coded index cap also visually displays one of said common size designations. Thus, the consumer at first identifies the size of the garment suspended from the hanger by the color of the index cap and then verifies the size by the size designation thereon.

For conservation purposes, it is contemplated that the color coded index caps may be removed from said hangers to enable reuse of the hanger with a different clothing line. Accordingly, the system of the present invention further includes a means for removing said color coded index caps from the hangers.

It is also contemplated that the index cap be automatically attached to the hanger. Consequently, the system of the present invention further includes an automatic means for attaching the color coded index caps to the hangers.

BRIEF DESCRIPTION OF THE FIGURES

The foregoing and other objects of the invention may now be more readily ascertained from the following detailed description of the preferred embodiments thereof, taken in conjunction with the accompanying drawings, in which:

FIG. 5 is an illustration of one family of hanger designs that may be used throughout a retail clothing store to uniformly display the articles of clothing for sale, and to display the color codes of the present invention;

FIGS. 6(a), 6(b) and 6(c) are three drawings, which when combined as indicated thereon, illustrate one representative example of a color code scheme of the present invention;

DETAILED DESCRIPTION OF THE INVENTION

Figure 1:
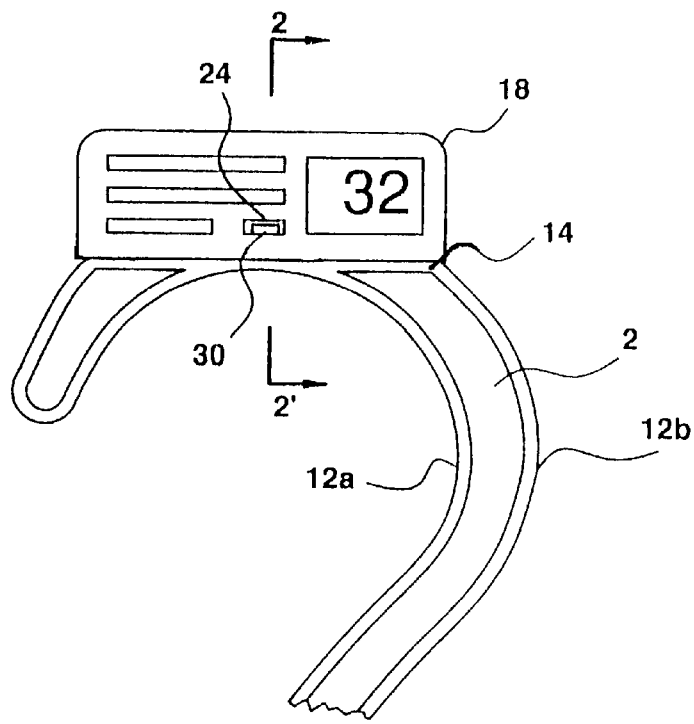
FIG. 1 illustrates a hanger hook with a color coded size cap mounted thereon that is useful in the practice of the present invention.
Figure 2:
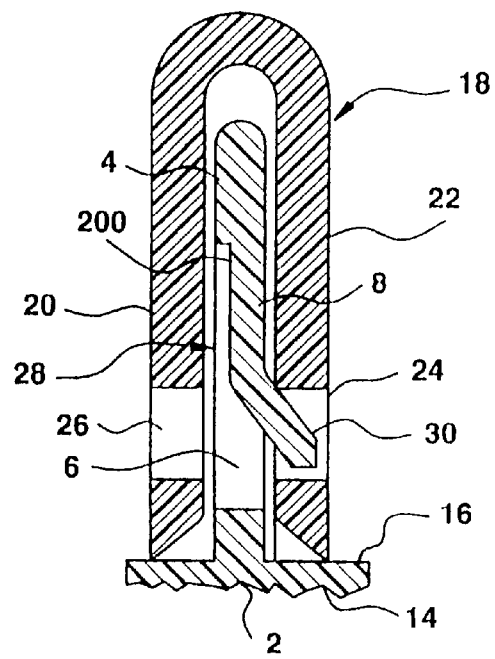
FIG. 2 is a cross section taken along section lines 2—2' of FIG. 1 which illustrates the interior construction of the hanger and hook combination illustrated in FIG. 1.

Referring now in detail to the drawings, and to the embodiments depicted in FIGS. 1 and 2, there is illustrated a hanger hook 2 with a color coded size cap 18 mounted thereon that is useful in the practice of the present invention. The hook 2 of a molded plastic garment hanger is shown in simplified form and is adapted to engage a rod or other supporting means. In practice the hook typically includes the strengthening ribs 12a, 12b around the perimeter of the hook. It will be noted that in FIGS. 1 and 2, the body and clips of the hanger are not depicted. The body and clip structure of the hanger can take on many different types of configurations as long as the hanger supports the garments suspended thereon. In FIG. 5, several exemplary hanger styles which will accommodate a variety of types of clothing are depicted. Each of the hangers shown in FIG. 5 includes a means for attaching a color coded size cap 18.

The color coded size cap 18 which is mounted on the hanger is more clearly illustrated in FIG. 2. As shown therein the size cap includes side walls 20, 22 formed with at least one retention aperture 24, 26, as described in Australian Patent No. 638436 and U.S. Pat. No. 5,388,354, the contents of which are incorporated into this specification by cross-reference. The apertures 24, 26 define through-openings which facilitate stacking of the indicator 18 with other indicators prior to fitting to a hanger.

The indicator is retained on the hook by an indicator attachment mechanism. As illustrated in FIGS. 1 and 2 the hook 2 is formed with a flange 14 defining a top region 16, which in a preferred embodiment is flattened and slightly larger in peripheral dimensions than the lowermost portion of an indicator 18. An upstanding web 4 extends centrally from the top region 16 of the hook 2. The web 4 can be shaped similarly to the shape of the cavity of the indicator 18 so as to comfortably fit within that cavity. As one alternative, the web 4 can be shaped to follow the normal contour of the hanger hook.

The web 4 is formed with integrally molded indicator attachment means 28. In the present embodiment the indicator attachment means includes central opening 6 from the upper portion of which a resilient detent leg 8 extends downwardly terminating in a laterally projecting portion 30 configured to engage one of the apertures 24 or 26 in the side wall of the indicator 18, as shown in FIG. 2.

Since the detent leg 8 is narrow and is resiliently connected to web 4, it is easily deflected laterally by means of a probe or pin inserted into the aperture 24 or 26 which engages laterally projecting portion 30 to displace laterally projecting portion 30 toward the plane of the web to clear the aperture 24 or 26 and allow the indicator to be removed from the web 4. This operation can be achieved simply and quickly with little or no damage to the indicator 18 or the attachment means 28. Nevertheless, while the laterally projecting portion 30 remains in the position shown in FIG. 2 of the drawings, the indicator 18 will remain securely fastened to the web 4 and will withstand all usual handling operations to which the hanger is subjected in day-to-day use.

To improve the flexibility of the detent leg 8, it can be reduced in thickness as shown at 200 in FIG. 2 of the drawings.

Other means for attaching indicators to hangers can be utilized, such as the means described in U.S. Pat. No. 5,388,354, wherein the indicator may also be retained on the hook by means of at least one abutment projecting from the hook which engages an aperture in the side wall of the indicator. However, when the indicator is retained by an abutment, the indicator is not easily removed from the hanger and either the hanger or the indicator may be damaged during the process.

Figure 3:
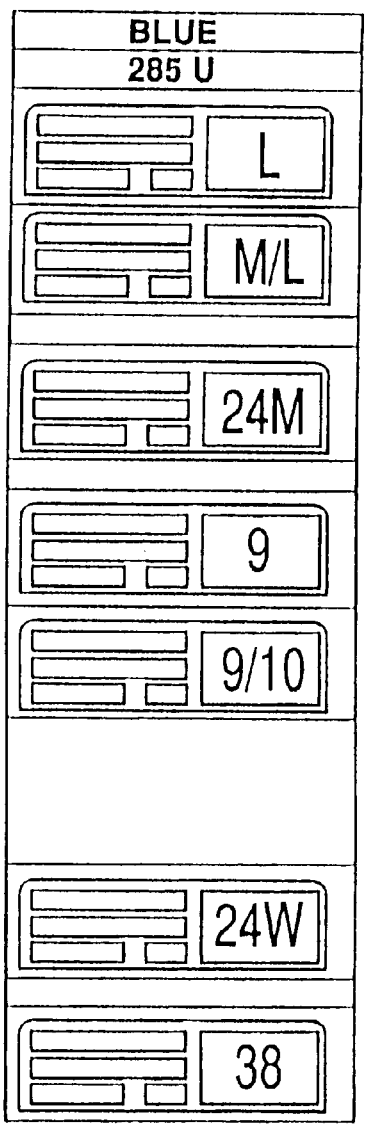
FIG. 3 is an illustration of a common color code assigned to various sub-sets of the plurality of graded size, as determined by large scale consumer demographics.

In the preferred embodiment of the present invention the size cap shown is of a rectangular configuration, see for example, FIGS. 1 and 3 and presented at the top of the hook. However, other shapes and configurations of size caps can be used in accordance with the present invention.

The indicator 18 of the preferred embodiment has been particularly well-received by retailers and consumers in the method and system for color coding sizes of clothing on display of the present invention.

In the present method and system, individual articles of clothing are classified according to line, such as men's apparel, women's apparel, infant and toddler apparel, youth apparel, girl's apparel, boy's apparel, intimate apparel, men's apparel sized by waist, women's apparel sized by waist, petite apparel and plus apparel. Each line of clothing is then further classified according to type of clothing. For instance, further classification in the women's line includes dresses, shirts, blouses, skirts, slacks, suits, sweaters, coats, jackets, panties, bras, and bathing suits.

Each of these lines of clothing is then segregated into a plurality of graded sizes with a plurality of common size designations that appear in all of the clothing lines. Common size designations may include XXS (extra, extra-small), XS(extra-small), P/S (petite/small), S(small), S/M (small/medium), M(medium), M/L(medium/large), L(large), L/XL (large/extra-large), XL(extra-large), XXL(extra-extra-large) and XXXL (extra-extra-extra large). Of these designations S, M, L and XL are almost universally available. Each of these common size designations designates clothes intended to fit consumers of a particular physiology.

In some situations, typically, when the clothing is more tailored, a more specific size designation is required and the size designations are referenced by numerals such as 2, 4, 6, 8, 10, 12, 16, 18 and 20; 1, 3, 5, 7, 9, 11 and 13; or 3/4, 5/6, 7/8, 9/10, 11/12, 13/14 and 15/16, which would appear in numerous clothing lines.

The particular graded sizes in different clothing lines that would be selected by a consumer selecting clothing appropriate for a particular physiology is then identified and a color code assigned to each graded size designation to form a matched set of graded sizes common to a specific consumer profile. The clothing is displayed on a hanger with a color coded size cap mounted thereon such that the color of the size cap conforms to the assigned color code.

For instance, in the color coding system illustrated in FIG. 3, the color blue has been assigned 7 different size designations: L, M/L, 24 M, 9, 9/10, 24 W and 38. As indicated by the sizes matched in this set, the blue color indicates a large size clothing. In women's apparel, the sizing used in different lines of clothing would typically be L or M/L and 9 or 9/10 to designate a particular physiology profile. A women of this physiology would know by using the color coding method and system of the present invention that she could look for garments hung on a hanger with a blue size cap to find clothes that matched her physiology.

In infant's apparel the sizing would typically be either large or 24 months both of which identify garments that would fit an infant of a particular physiology. Thus, the consumer could then look for garments hung on hangers with a blue size cap to find appropriate garments.

It will be noted that the same color designating the larger sized clothing in the women's apparel line is used to designate the larger sized clothing in the infant apparel line. This system can be followed in garments sized by waist, where for instance the blue color indicates a 38 waist and also in the plus-sized apparel to designate a 24 W, where the plus-sized line of clothing runs from size 16 W to 26 W. This system permits the purchaser to move from department to department of a retail store and find articles of clothing appropriate to fit a particular physiology based on the color coding of the sizes. Furthermore, this same consumer can make purchases for others knowing only the bare basics of the recipient's physiology.

Figure 4:
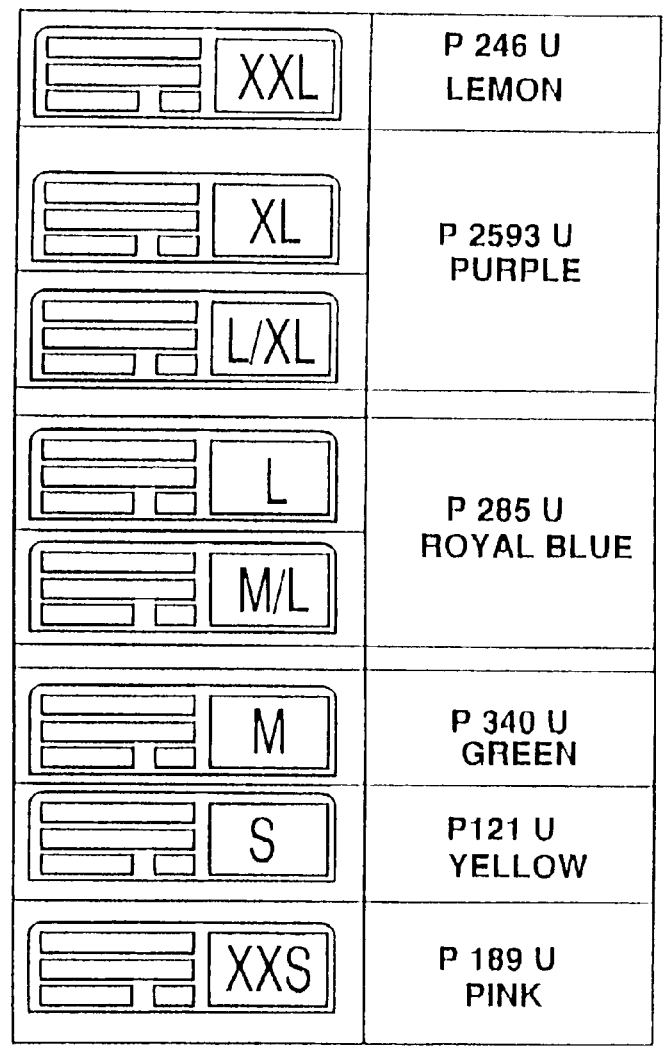
FIG. 4 is an illustration of one set of common size designations illustrating a sub-set of the plurality of graded sizes of the present invention.

FIG. 4 illustrates one set of common size designations showing a subset of the plurality of graded sizes of the present invention wherein:

lemon designates XXL
purple designates XL or L/XL
blue designates L or M/L
green designates M
yellow designates S
pink designates XXS.

A different color designates each graded size in this universal system of sizing. It will be noted that there are two size designations for purple and blue. This is possible because a single manufacturer of clothing would not typically use both forms of sizing for the same type of garment. However, both forms of sizing may be found in a single classification of clothing. By designating all clothing that can fit a specifically sized person with a single color the consumer then easily knows to look for that color size cap when selecting clothing.

FIG. 5 illustrates one family of hanger designs that may be used throughout a retail clothing store to uniformly display the articles of clothing for sale and to display the color codes of the present invention. Hangers 300, 302 and 304 are typically used to hang tops which include shirts, blouses, dresses, coats, jackets, robes, nightgowns, rompers, overalls, swimwear and sweaters. Hanger 300 which is 12 inches long can be used to hang infant and toddler tops, hanger 302 which is 14 inches long can be used to hang kids tops and hanger 304 which is 17 inches long can be used to hang adult tops. Hangers 306, 308 and 310 are typically used to hang bottoms such as slacks, denims and skirts. Hanger 306 which is 8 inches long can be used to hang infant and toddler bottoms, hanger 308 which is 10 inches long can be used to hang children's bottoms and hanger 310 which is 12 inches long can be used to hang adult bottoms. Hanger 312 can be used to hang bras, panties, slips and bathing suits. A hanger body length of about 10 inches is preferred to accommodate a variety of different sizes. Hanger 314 is a frame hanger which can be used to hang infant and toddler separates and coordinates. The varying lengths of hangers 300–310 accommodate virtually all of the different lines of clothing ranging from infants to plus sizes.

Each of these hangers includes an indicator attachment mechanism as described previously herein to display the color coded size caps described herein at the top of the hook. Typically a retail store utilizes many different hanger designs depending upon the type of garment and the manufacturer. Limiting the number of hangers used throughout the store to about eight different designs is an extremely cost-effective maneuver which will also standardize the display and result in a neater appearance. However, it will be noted that the eight designs of FIG. 5 constitute a preferred embodiment of the present invention. Any hanger with an indicator attachment mechanism suitable for receiving a color coded size cap can be used in the method and system of the present invention.

FIGS. 6(*a*), 6(*b*) and 6(*c*) illustrate one representative example of a color code scheme of the present invention which can accommodate the sizing needs of all lines of clothing and departments in a large retail store.

At the far left of FIG. 6(*a*) designated as Rows A–G are a plurality of size classifications which would be appropriate for a plurality of clothing lines are designated as universal, tall/multi, infant or toddlers, metric, multi-sizes, plus-size and waist sizes. It will be noted that more than one size classification may be found in a single line of clothing. For instance, in women's apparel, clothing may be sized in universal sizes (Row A), metric sizes (Row D) (typically, odd numbers, even numbers or multi-sizes), plus sizes (Row F) or by waist (Row G).

To the right of each class designation in each row is a series of graded size designations appropriate for each class. The size designations are based on large scale consumer physiological demographics, so that in identifying the graded size for an item of clothing sized by a waist size, the size identified is common to the graded size of an item of clothing sized by chest size or universal size for the same consumer physiological profile.

The particular graded sizes in different clothing lines that would be selected by a consumer for a specified physiological profile are set forth in columns each of which are assigned a color. Each color designates a specific size which will fit a consumer of a particular physiological profile. The color coded size cap mounted on the hanger (such as any hanger depicted in FIG. 5) from which the garment is suspended can be used to determine which clothing on display is to be selected to form a matched set of graded sizes common to a specific consumer physiology.

About 16 different colors are needed to differentiate between all of the different sizes. One family of colors is set forth in FIG. 6 in Columns 1–20, which includes: lemon (Pantone 101 U), pink (Pantone 189 U), aqua (Pantone 326 U), red (Pantone 192 U), tan (Pantone 145 U), yellow (Pantone 121 U), light blue (Pantone 306 U), green (Pantone 340 U), sky blue (Pantone 2975 U), light purple (Pantone 2715 U), olive (Pantone 398 U), blue (Pantone 285 U), orange (Pantone 165 U), dark purple (Pantone 2593 U), light green (Pantone 375 U) and burgundy (Pantone 246 U). Colors can be reused in different lines of clothing where the sizes do not overlap but still typically designate either a larger, smaller or medium size.

For instance in the present embodiment it will be noted that the colors yellow, aqua, tan and sky blue have been used more than once in designating a physiological profile. Using the color aqua (Columns 3 and 18) as an example, the sizes 2 and waist 29 designate one physiological profile, while XXXL, 15 and 15/16 designate a completely separate physiological consumer profile. There would be no overlap in the lines of clothing sought by individuals between these two size groups. The size 4T is also designated by the color aqua. Again this size does not overlap with either of the other two size groups which renders it permissible to reuse the color in the toddler line. Also it is noted that the size 4T is one of the largest toddler sizes bringing the use of the color in line with its larger size designation. When a color is used to designate a multitude of sizes in nonoverlapping lines of clothing it will not be a color used to designate one the more common sizes such as S, M or L.

However, typically a color will only be used once to designate a single physiological profile. More than 70% of all size caps will fall into one of five colors that designates the physiological profile for the following universal sizes: XS, S, M, L and XL and the corresponding size classes designated by row. To enhance the visibility of these size caps for these most common sizes the size caps are assigned the brightest and most basic colors, respectively—red, yellow, green, blue and purple.

Blue for instance designates a large size in the present embodiment as discussed previously with respect to FIG. 3. Yellow designates the size small. Corresponding to this physiological profile for a women's line of clothing are the sizes S, 5, 5/6, and waist 32. Clothes marked with these sizes would all fit a women of a particular physiological profile. The sizes S and 12 M also would fit an infant of a particular physiological profile and the size 20 W is considered to be a small plus-sized garment. Accordingly, attaching a yellow size cap to the hangers from which each of these garments are suspended would enable a consumer to match up all the different clothes from numerous clothing lines and by numerous manufacturers which fit a particular physiology identified as being small. Thus, the consumer could move from department to department reviewing numerous lines of clothing from slacks, to suits, to coats, to dresses, to intimate apparel and find the size appropriate for that consumer's particular physiological profile. The consumer would even recognize the color as designating a particular size profile in other lines of clothing, such as an infant or men's apparel.

By placing a color coded size cap at the top of each hanger the consumer is greatly aided in locating all garments designed to fit a particular physiological profile in numerous different departments from different clothing lines no matter how the garment is sized, universally or metrically. This also aids the salesperson who is assisting the consumer in looking for a particular garment either on the floor of the store as well as in the back rooms of the store where any additional garments are stored, replenishing a rack of clothing, organizing a rack of clothing according to size or re-organizing a rack of clothing by size at the end of the day.

It is also contemplated that in the preferred embodiment of the system of the present invention the color coded size caps and the garments are assembled at the point of manufacture and arrive at the store already on the hanger. This means that the actual matching of the color coded size cap and an article of clothing takes places before shipment of the garment from the manufacturer. The garment arrives at the retail store, floor ready. The prehung color coded sized garments need only be removed from a box and hung on the rack. Most of the typical back room work in a retail store is eliminated, thus making the system of the present invention extremely cost-efficient. In a preferred embodiment, the attachment of the color coded size cap to the hanger is performed automatically at the time the garment is hung. Although the attachment could also be by manual means.

Figure 7:
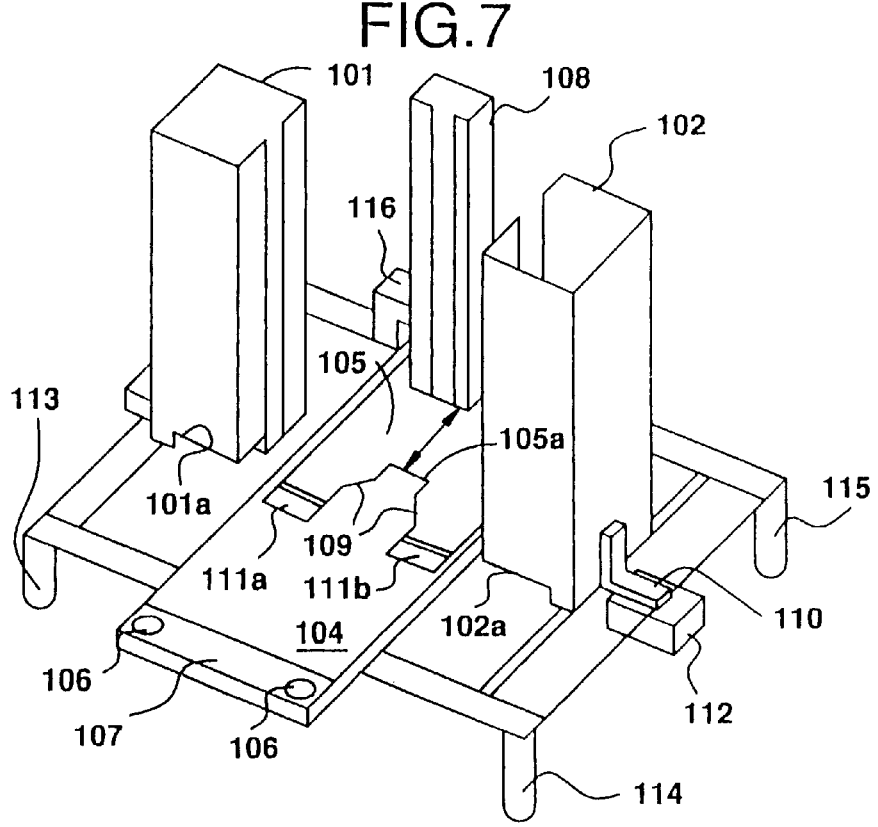
FIG. 7 is an isometric view of a mechanism useful in the automatic assembly of the color coded index caps and hangers of the present invention.
Figure 8:
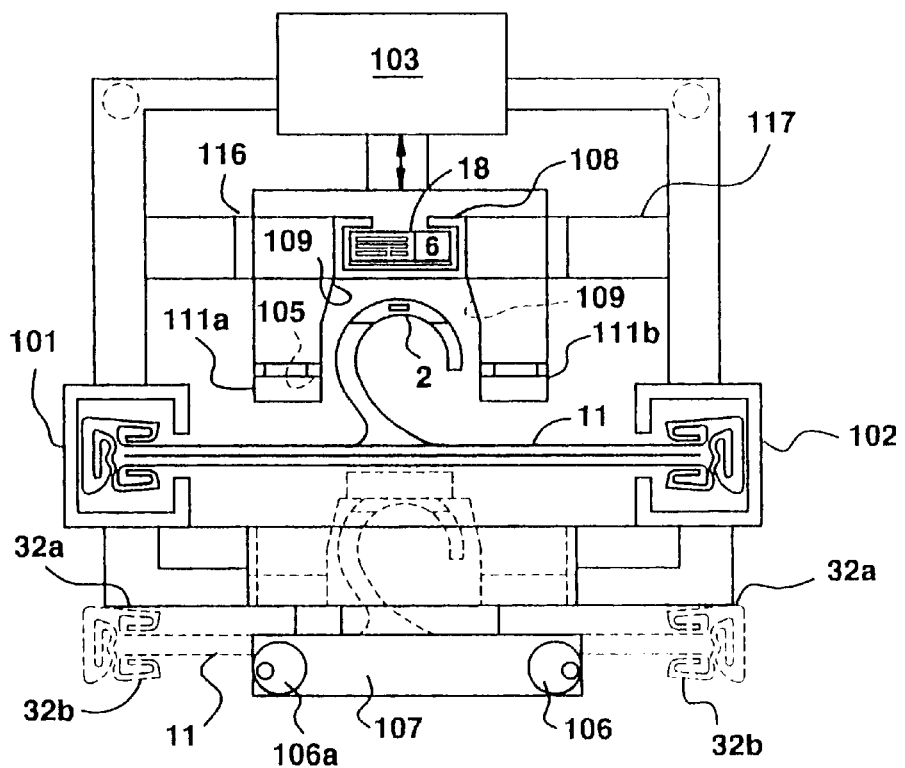
FIG. 8 is an plan view of the mechanism shown in FIG. 7 illustrating the assembly of a color coded index cap to a hanger as taught by the present invention.

One such means for automatically attaching a color coded size cap to hanger is illustrated in FIGS. 7 and 8 and is more specifically described in U.S. Pat. Nos. 5,272,806; 5,285,566 and 5,507,087, the contents of which are incorporated herein by reference. It will be noted that each of these patents is assigned to the assignee of the present invention. In the illustrated embodiment of a system for attaching an indicator to a hanger, the attaching means includes a pair of magazine towers 101 hangers therebetween and a third magazine 108 which receives a bundle of stacked indexing caps. The hangers rest on platen member 104 and are selectively engaged by a reciprocating plate 105 which includes a cutout 105a conforming to the exterior dimensions of the index coded cap 18.

Immediately adjacent cut-out 105a are alignment cams 109. The ends 111a, 111b of reciprocating plate 105 provide a spring loaded tip for engagement of the hanger 11. In addition, the magazines 101 and 102 are independently adjustable by means of bracket 110 and support 112 to configure the system to a wide variety of hanger shapes including those depicted in FIG. 5. Each of the magazines 101, 102 and 108 have cut-outs 101a, 102a which allow the hangers and index caps to be withdrawn from the magazines as plate means 105 reciprocates forwardly as illustrated in FIG. 7. Stand-off legs 113–115 are used to elevate the system above the employee work bench, to assist the operator in draping the article of clothing about the hanger before the hanger is withdrawn from the system. Alternately, the individual legs can be altered in length to provide a slanted configuration which will facilitate hanging clothes therefrom.

As illustrated in FIG. 8, the system is loaded with a bundle of stacked caps indicated at 18 which are loaded into magazine 108. Magazine 108 is suspended above the reciprocating plate 105 and platen 104 by brackets 116, 117. Prior to engagement with the hanger 11 the spring loaded tips 111a, 111b of reciprocating plate 105 are fully distended. As Plate 105 moves forward, or downwardly as illustrated in FIG. 8, it first engages an index cap from the stack of caps 18 within recess 105a. The alignment surface 109 centers the hook 2 within the reciprocating plate 105 so that the indicator attachment mechanism on the hook is properly aligned with the index cap 18 during attachment. Plate 105 is dimensioned such that the index cap is seated on hook 2 by the impact of plate 105 as the floating spring loaded tips 111a, 111b engage the center portion of hanger 11. The hanger is then driven forwardly out of the magazines 101, 102 to the position illustrated by the dotted lines in FIG. 8.

The hanger engages eccentric stops 106a, 106b and displaces the end portion of platen 104 outwardly as illustrated in FIG. 8. The spring loaded tips 111a and 111b compensate for irregularities in hanger molding and reduce the impact of the reciprocating plate 105 on the central portion of the hanger. This substantially eliminates the broken and shattered hangers normally encountered in this type of device. As the pneumatic cylinder 103 drives platen 104, the spring loaded tips 111a, 111b are compressed, and the spring loaded platen 107 is between platen 104, and platen 107. As illustrated in FIG. 8, the hanger is now presented to the operator with the clips 32a–32b suspended above the work space and free from any immediately adjacent encumbrances, so that the operator may quickly and easily attach a garment thereto. As the article of clothing is attached to the hanger, it is lifted free of the spring loaded tips 111a, 111b of platen 105, which allows platen 107 to close thereby actuating the control mechanism for the system to return reciprocating plate 105 back to its original starting position. If set on automatic, as soon as the plate 105 has reciprocated to its fully retracted position, it is reciprocated forward to automatically dispense another index coded cap and hanger.

In still another embodiment the system for color coding sizes of clothing displayed in retail clothing stores includes automatic means for removing the color coded index caps to the hangers.

Figure 9:
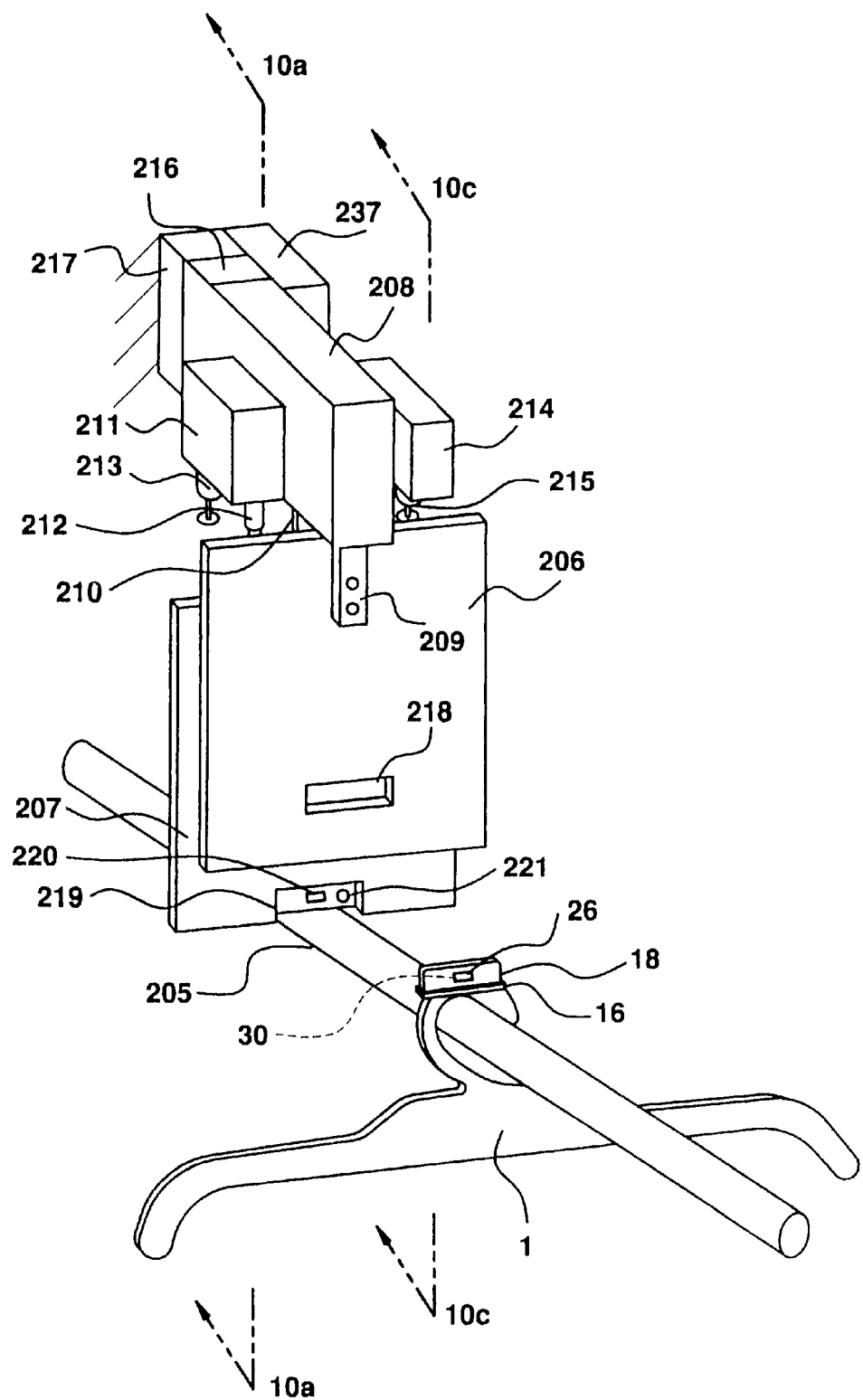
FIG. 9 is an isometric view of a mechanism useful in the dis-assembly of the color coded index caps from the hangers to enable reuse of the hangers.
Figure 10A:
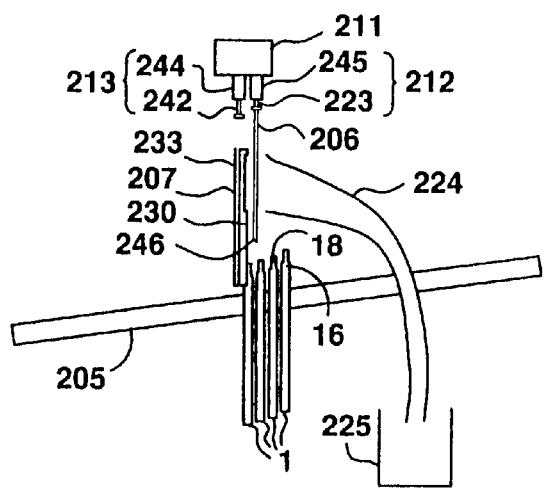
FIGS. 10(a), 10(b) and 10(c) illustrate in sequence the operation of the mechanism illustrated in FIG. 9 as the hanger and color coded index cap are disassembled.

FIGS. 9 and 10(a), (b) and (c) illustrate one such means for removal wherein the indicator attachment mechanism is of the embodiment depicted in FIGS. 1 and 2 herein. The laterally extending portion 30 of the indicator attachment mechanism is easily deflected by means of a pin 220 inserted in the aperture 24 of indicator 18 which engages the laterally extending portion to displace it towards the plane of web 4 to clear the aperture 24 and allow the indicator 18 to be removed from the hanger 1. Using this system, which is described more particularly in International Application No. PCT/US96/01286 the contents of which are incorporated herein by reference thereto, the color coded indexing caps can be automatically removed from their respective hangers 1.

In this embodiment the hanger 1 is fed to the apparatus for removing the color coded index cap by a feeding rail 205. The feeding rail is inclined so that the hangers 1 move downwardly toward the apparatus by gravity. To initiate the process the hangers 1 can be placed onto the feeding rail 205 manually or automatically. Other means to feed hangers 1 to the apparatus can comprise a screw conveyor, a belt conveyor, or any other appropriate means to carry the hangers toward the apparatus.

The apparatus of the present embodiment includes a front plate 206, a back plate 107 and an actuating means 208. Front plate 206 and back plate 207 are arranged vertically and are facing each other. In the embodiment shown in FIG. 9, the two plates 206 and 207 are almost quadratic, however, any other appropriate shape, for example rectangular, can be used.

The actuating means 208 includes a pneumatically driven escapement valve with two rods. Each of the rods is connected to the plate 206 or 207 via respective connecting means 209 and 210. In use, the actuating means 208 moves the front plate 206 and the back plate 207 parallel to each other in a vertical plane. This movement is periodically repeated to permit the removal of cap from one hanger after another.

Back plate 207 has a recess 219 positioned on an outer portion of the surface facing the front plate 206. Recess 219 is dimensioned to correspond to the dimensions of indicator 18, so that when a hanger 1 is pressed against the back plate 207, the indicator 18 is received in the recess 219. A pin 220 is provided on the back wall of the recess 219 in a position corresponding to the aperture 24 of the indicator 18. The dimensions, such as the size and the shape, of the pin 220 are selected according to the dimensions, particularly, the shape and the depth, of the aperture 24, so that the pin 220 enters the aperture 24 and is able to displace the laterally projecting portion 30 of the web 4 of the hanger 1 to clear the aperture 24, and permit the indicator 18 to be removed from the hanger 1. In the preferred embodiment of FIG. 9, the pin 220 has a rectangular cross-section, but another appropriate shape can be used.

Front plate 206 includes a through-opening or window 218. Window 218 is preferably dimensioned to correspond to the configuration of recess 219 of back plate 207. However, the window 218 can have any appropriate shape, as long as the indicator can pass through it. When back plate 207 is in its upper position and the front plate 206 is in its lower position, the recess 219 and the window 218 match, so that the indicator 18 can be removed from the recess 219 through the window 218.

In the described embodiment the preferred method for removal of the indicator 18 from recess 219 is by means of an air blast through aperture 221 in the back wall of recess 219. Aperture 221 is connected to an air control means by means of a tube 227, shown in FIG. 10(c). The air blast through the opening 221 is controlled so that when the back plate 207 reaches its upper position, and the front plate 206 is in its lower position, the air blast is generated or enabled, which pushes the indicator 18 through the window 218 of front plate 206. The released indicator passes through the window 218 and is collected by a discharge tube or chute 224, positioned in front of the window 218 and leads the released indicator to a container 225 (shown in FIGS. 10(a) and 10(c)).

The feeding rail 205 extends under the two plates 206 and 207. The distance between the plates 206 and 207 and the feeding rail 205 when the plates are in their lower positions is preferably such that pin 220 of back plate 207 will be aligned with aperture 24 of indicator 18. The height of the assembly is adjusted to provide an automatic operation for different styles of hangers and hooks.

As illustrated in FIG. 9 the back plate 207 is in its lower position and the front plate 206 is in its upper position. When hanger 1 moves down the feeding rail 205 toward the decapping apparatus the movement of the hanger 1 is stopped by the back plate 207.

Figure 10B:
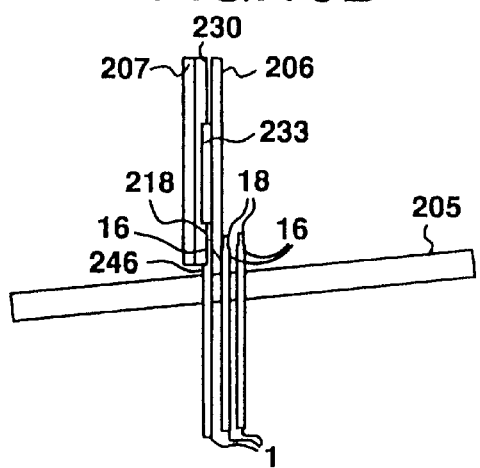
Figure 10C:
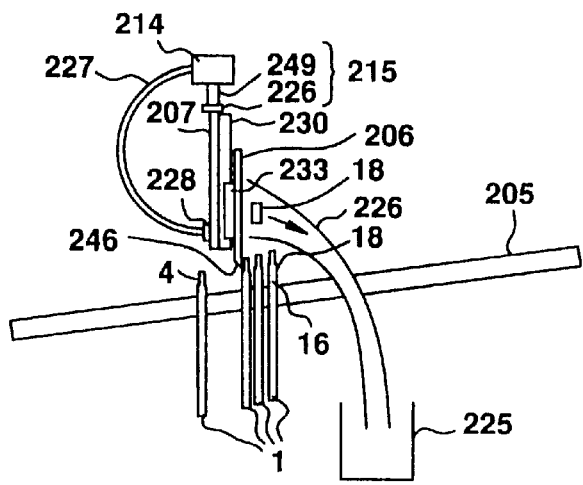

FIGS. 10(a), 10(b) and 10(c) illustrate the sequence of the operation for automatically removing color coded index caps from hangers in accordance with the present invention.

More particularly, FIG. 10(a) illustrates the start of the cycle for removing color coded index caps 18 from a plurality of hangers. As shown, it will be noted that the back plate 207 is lowered to its lowermost position and a plurality of hangers are waiting in front of the decapping apparatus on the feeding rail 205 in line for removal of the indicator caps 18 one after the other.

The front plate 206 is raised but only needs to be raised upwardly until it no longer covers the recess 219. In other words, the amplitude of the movement of the plates 206 and 207 has to be at least the height of the recess 219, so that the indicator 18 can be received in the recess 219.

Gravity pushes the foremost hanger with indicator into the recess 219 of back plate 207. After the indicator 18 is received in the recess 219 of the back plate 207, the front plate 206 is moved downwardly to seat the indicator 18 firmly or at least to hold the indicator firmly in the recess 219 of the back plate 207. In this position the pin 220 of the back plate 207 displaces the laterally extending portion 30 of the hanger 1, to permit the release of the indicator 18 from the hanger 1. The pin 220 is long enough to fully displace the laterally extending position 30 from the recess 24 of indicator 18, but is not long enough to engage the aperture 6 of hook 2.

FIG. 10(b) illustrates the sequence of removing the indicator 18 from a hanger 1 mid-cycle when both the front and back plates 206 and 207 are in their lower positions. After the pin 220 releases the indicator attachment mechanism the front plate 206 is lowered to separate the released indicator and hanger 1 from the rest of the hangers and also to engage the foremost hanger 1. To assist in the separation of the foremost hanger 1 with the released indicator from the other hangers the lower edge 246 of the front plate 206 can be beveled. The beveled lower edge 246 of the front plate 206 holds the hanger 1 down by abutting against the edge of the top region 16 of the hook of the hanger 1. As shown in FIGS. 10(a)–10(c) lower edge 246 of front plate 206 is beveled towards the back plate 207. As one alternative, lower edge 246 can have a step-shape.

FIG. 10(c) illustrates the end of the cycle wherein the pin 220 has displaced the laterally extending portion 30 from the indicator 18, and the indicator may be removed from hanger 1 when the back plate 207 is moved upwardly to its upper position, while the front plate 206 stays in its lower position. Since pin 220 of the back plate 207 extends into the aperture 24 of the indicator 18, the back plate 207 carries the indicator 18 upwardly. The front plate 106 engages hanger 1 and prevents the hanger 1 from also being carried upwardly.

Consequently, the pin 220 has two functions: displacing the laterally extending portion 30 of the hanger 1 to release the indicator 18 from the hanger 1 and carrying the indicator 18 upwardly to separate the indicator 18 from the hanger 1.

As previously described the indicator 18 is preferably removed from recess 219 by means of air blast through aperture 221 in back plate 207. The air blast pushes the indicator 18 through the window 218 of the front plate 206. The released indicator 18 passes through the window 218 of the front plate 206 and is collected by a discharge tube 224, which is positioned in front of the window 218 and leads the released indicator to a container 225.

Upon removal of the indicator 18 from hanger 1 and after back plate 207 is moved upwardly, hanger 1 continues to slide down the feeding rail 205. As illustrated in FIG. 10(c), hanger 1 with web 4 is moving down the feeding rail 205 after being decapped. The decapped hanger is either collected manually or automatically therefrom, for example by means of a screw conveyor, which can collect decapped hangers from a plurality of feeding rails 205 coming from respective decapping apparatuses.

As illustrated in FIGS. 9 and 10(a), the automatic means for removing indicators from hangers is driven pneumatically, and further comprises position control means 211, air control means 214, a first timer 216, a second timer 217, and an air valve 237. The air valve 237 generates and/or controls the pressurized air, by which the decapping apparatus according to the preferred embodiment of the present invention is controlled and driven.

The air valve 237, the timers 216 and 217, the actuating means 208, the air control means 240 and the position control means 211 respectively are connected by air tubes for pneumatic control. Also, the entire apparatus is held and fixed to a holding means (not shown).

As shown in FIG. 10(a), the position control means 211 comprises a first detector 212 for the position of the front plate 206 and a second detector 213 for the position of the back plate 207. The first detector 212 and the second detector 213 work on a pneumatical basis and have a similar structure. First and second detectors 212 and 213 each include generally a cylindrical tube illustrated by 244 and 245, respectively, and pistons 222 and 223, respectively, which are movable within each of said cylindrical tubes 244 and 246. The outer ends of pistons 222 and 223 are provided with contact plates, which are contacted by the upper sides of the front plate 206 and the back plate 207, respectively.

In the upper position, the front plate 206 and the back plate 207 press inwardly pistons 222 and 223, respectively, and cause a pneumatic signal in the position control means 211, thereby permitting a steady control of the position and the movement of the plates 206 and 207. FIG. 10(a) shows a cross section of the control means 211 and the plates 206 and 207, whereby the position of the plates 206 and 207 is the same as in FIG. 9. Also, the discharge tube 224 and a collecting container 225 for the released indicators 18 are illustrated.

FIG. 10(c) illustrates a side view of the air control means 214 and the tube plates 206 and 207. The air control means 214 comprises a third detector 215 for detecting the position of the back plate 207. Third detector 215 has a cylindrical tube 249 and a piston 226, which, generally have the same shape and function as the first and second position detectors 212 and 213 as described above. In FIG. 10(c), the back plate 207 is in its upper position, and the front plate 206 is in its lower position. The back plate having released and carried a indicator 18 upwardly from hanger 1, contacts a contact plate 226 of the position detector 215 and moves the contact plate 226 together with its piston into the cylindrical tube of the detector 215. This causes a pneumatic signal within the air control means 214, which enables a pressurized air blast through a tube 227, which is connected to the opening 221 of the back plate 207 by appropriate connection 228. The air blast through the opening 221 ejects the released indicator 18 through the window 218 of the front plate 206 into the discharge tube 224. The arrow in FIG. 10(c) indicates the direction of the movement of the indicator 18.

In operation, the back plate 207 moves downwardly to its lower position, which is followed by an upward movement of the front plate 206 to its upper position. The whole movement cycle is repeated periodically, so that a plurality of hangers 1 can be decapped easily and reliably in an automated process. Since one of the plates 206 and 207 is always in its respective lower position, there will be always a number of hangers 1 on the feeding rail 205 waiting to be decapped one after another, as shown in FIGS. 10(a)–10(c).

The actuating means 208 controls the movement of the two plates 206 and 207, so that the front plate 206 cannot move upwardly when the back plate 207 is not in its lower position, and the back plate 207 cannot move upwardly when the front plate 206 is not in its lower position. This ensures that the hangers to be decapped do not slide along the feeding rail 205 under the plates 206 and 207 without being decapped.

The first timer 216 controls the regular cycle of the movement of the two plates 206 and 207, whereas the second timer 217 enables a repeated downward movement of the front plate 206. If, for example the hook of the hanger 1 is bent or damaged, or the indicator 18 is bent or damaged, the front plate 206 is not permitted to slide downwardly to press or hold the indicator 18 into the recess 219, since its lower edge contacts the upper edge of the indicator 18 and is therefore restricted in its downward movement. In this case, the timer 217 gives a signal to the actuating means 208 to lift the front plate 206 up again and retry to move it downwardly. This is repeated, until the indicator 18 is properly received in the recess 219 of the back plate 207 and the front plate 206 can move to its lower position without resistance. This problem can already partially be avoided by an appropriate angle or bend of the lower edge of the front plate 206, as discussed above.

Although the system of FIGS. 9 and 10 has been illustrated with only one style of hanger shown in FIG. 5, it is contemplated that a hanger of any other style, including the styles shown in FIG. 5, could be substituted therefore.

In the preferred embodiment, the hanger of the present invention is formed from styrene, K resin, H.I. styrene, polypropylene, other suitable thermoplastic or combinations thereof. The indicator of the present invention is formed from styrene or any other suitable plastic material.

While there have been shown and described what are considered to be the preferred embodiments of the invention, it will, of course, be understood that various modifications and changes in form or detail can be readily made without departing from the spirit of the invention. It is therefore intended that the invention not be limited to the exact form and detail herein shown and described nor to anything less than the whole of the invention herein disclosed as hereinafter claimed.

I claim:

1. A method of color coding the sizes of clothing displayed in retail clothing stores having a plurality of clothing lines for a plurality of consumer groups, wherein each consumer group includes individual consumers of similar physiology, said method providing a uniform color sizing code to assist individual consumers in locating items of clothing in different lines of clothing appropriate to their physiology, said method comprising:

(a) classifying the individual items of clothing to be offered for sale into a plurality of clothing lines;

(b) segregating each of said clothing lines into a plurality of graded sizes, said graded sizes having a plurality of common size designations that appear in all of said lines;

(c) identifying graded sizes in different clothing lines that would be selected by a consumer selecting clothing appropriate for the same consumer physiology;

(d) assigning a common color code to each graded size designation identified in step (c) above to form a matched set of graded sizes common to a specific consumer physiology for each clothing line in said retail store having clothing for that physiology; and (e) displaying the individual items of clothing on hangers having a color coded size cap mounted thereon, the color of said size cap conforming to the assigned common color code, whereby a consumer may move from an area displaying one line of clothing to another area within said retail store displaying other lines of clothing and find articles of clothing appropriate to their physiology identified by the same common color code in each of said lines of clothing.

2. The method of color coding the sizes of clothing displayed in retail clothing stores as claimed in claim 1, wherein the individual lines of clothing include women's apparel, men's apparel, women's apparel sized by waist, men's apparel sized by waist and plus sized apparel.

3. The method of color coding the sizes of clothing displayed in retail clothing stores as claimed in claim 2, wherein the individual lines of clothing further include infant and toddler apparel, youth apparel, and intimate apparel.

4. The method of color coding the sizes of clothing displayed in retail clothing stores as claimed in claim 1, wherein the plurality of common size designations includes S(small), M(medium), L(large) and XL(extra large).

5. The method of color coding the sizes of clothing displayed in retail clothing stores as claimed in claim 4, wherein the plurality of common size designations further include P (petite), XS(extra-small), M/L(medium/large) and XXL(extra-extra large).

6. The method of color coding the sizes of clothing displayed in retail clothing stores as claimed in claim 1, wherein the graded sizes identified in step (c) are based on large scale consumer physiological demographics, so that in identifying the graded size for an item of clothing sized by a waist size, the size identified is common to the graded size of an item of clothing sized by a chest size for the same consumer physiological profile.

7. The method of color coding the sizes of clothing displayed in retail clothing stores as claimed in claim 6, wherein a female consumer conforming to an average physiological demographic profile can move area to area within the retail store, reviewing plural lines of clothing, as for example, from slacks, to suits, to dresses, to coats and to intimate apparel and find a size appropriate to her physiological profile identified by the same color code in each area for each separate line of clothing.

8. The method of color coding the sizes of clothing displayed in retail clothing stores as claimed in claim 1, wherein the common color codes are selected from 16 easily distinguishable colors.

9. The method of color coding the sizes of clothing displayed in retail clothing stores as claimed in claim 8, wherein the only colors repeated for graded size designations are repeated in clothing lines not worn by the same consumer, as for example in an infant/toddler clothing line and a plus clothing line.

10. A system for color coding the sizes of clothing displayed in retail clothing stores having a plurality of clothing lines for a plurality of consumer groups, wherein each consumer group includes individual consumers of similar physiology, said system providing a uniform color sizing code to assist individual consumers in locating items of clothing in different lines of clothing appropriate to their physiology in different areas of the retail store, said system comprising:

(a) a plurality of individual items of clothing to be offered for sale, each item classified into one of a plurality of clothing lines;

(b) a plurality of graded sizes for each of said clothing lines, said graded sizes having a plurality of common size designations that appear in all of said lines;

(c) a common code group having the same code identification for identifying graded sizes in different clothing lines that would be selected by a consumer selecting clothing appropriate for the same consumer physiology;

(d) a plurality of color coded index caps, each of said colored codes assigned to a common code group identified in step (c) above to form a matched set of color coded index caps identifying graded sizes common to a specific consumer physiology for each clothing line in said retail store having clothing for that physiology;

(e) a plurality of hanger styles for displaying the individual items of clothing, each of the hangers having one of said color coded index caps mounted thereon, the color of said index cap conforming to the assigned common code group, whereby a consumer may move from an area displaying one line of clothing to another within said retail store displaying other lines of clothing and find articles of clothing appropriate to their physiology displayed on hangers identified by the same index cap color in each of said lines of clothing.

11. The system for color coding the sizes of clothing displayed in retail clothing stores as claimed in claim 10, wherein the individual lines of clothing include women's apparel, men's apparel, women's apparel sized by waist, men's apparel sized by waist and plus sized apparel.

12. The system for color coding the sizes of clothing displayed in retail clothing stores as claimed in claim 11, wherein the individual lines of clothing further include infant and toddler apparel, youth apparel, and intimate apparel.

13. The system of color coding the sizes of clothing displayed in retail clothing stores as claimed in claim 10, wherein the plurality of graded size designations include S(small), M(medium), L(large) and XL(extra large).

14. The system for color coding the sizes of clothing displayed in retail clothing stores as claimed in claim 13, wherein the plurality of graded size designations further include XS(extra-small), M/L(medium/large) and XXL (extra-extra large).

15. The system for color coding the sizes of clothing displayed in retail clothing stores as claimed in claim 10, wherein the graded sizes identified in step (c) are based on large scale consumer physiological demographics, so that in identifying the graded size for an item of clothing sized by a waist size, the size identified is common to the graded size of an item of clothing sized by a chest size for the same consumer physiological profile.

16. The system for color coding the sizes of clothing displayed in retail clothing stores as claimed in claim 15, wherein a female consumer conforming to an average physiological demographic profile can move from area to area within the retail store, reviewing plural lines of clothing, as for example, from slacks, to suits, to dresses, to coats and to intimate apparel and find the size appropriate to her physiological profile identified by the same color coded index cap in each area for each separate line of clothing.

17. The system for color coding the sizes of clothing displayed in retail clothing stores as claimed in claim 10, wherein the plurality color codes used by said color codes index caps are selected from 16 easily distinguishable colors.

18. The system for color coding the sizes of clothing displayed in retail clothing stores as claimed in claim 17, wherein the only colors repeated for graded size designations are repeated in clothing lines not worn by the same consumer, as for example in an infant/toddler clothing line and a plus clothing line.

19. The system for color coding the sizes of clothing displayed in retail clothing stores as claimed in claim 10, wherein each color coded index cap also visually displays one of said common size designations.

20. The system for color coding the sizes of clothing displayed in retail clothing stores as claimed in claim 10, wherein said color coded index caps may be removed from said hangers to enable reuse of the hanger with a different clothing line.

21. The system for color coding the sizes of clothing displayed in retail clothing stores as claimed in claim 10, wherein said system further includes a means for removing said color coded index caps from said hangers.

22. The system for color coding the sizes of clothing displayed in retail clothing stores as claimed in claim 10, wherein said system further includes an automatic means for attaching said color coded index caps to said hangers.

23. The system for color coding the sizes of clothing displayed in retail clothing stores as claimed in claim 19, where said color coded index caps are selected and colored, said colors comprising Pantone colors 101U, 189U, 326U, 192U, 145U, 121U, 306U, 340U, 297U, 2715U, 398U, 285U, 165U, 2593U, 375U, and 246U.

24. The system for color coding the sizes of clothing displayed in retail clothing stores as claimed in claim 19, wherein said hanger styles are selected from a common family of hangers designs that uniformly display the color coded index caps, said family comprising 3 top hangers, 3 bottom hangers, at least one intimate apparel hanger and at least one frame hanger.

\* \* \* \* \*

UNITED STATES PATENT AND TRADEMARK OFFICE
CERTIFICATE OF CORRECTION

PATENT NO. : 5,944,237
DATED : August 31, 1999
INVENTOR(S) : Stanley F. Gouldson It is certified that error appears in the above-identified patent and that said Letters Patent are hereby corrected as shown below:

Column 2, Line 67: "arid" should read --and--

Column 18, Line 23, Claim 23: "297 U" should read --2975 U--

Signed and Sealed this

Twenty-ninth Day of May, 2001

Attest:

NICHOLAS P. GODICI

Attesting Officer

Acting Director of the United States Patent and Trademark Office